July 12, 1938.
C. F. RAUEN
2,123,202
SPRAG CLUTCH
Filed Feb. 6, 1935
4 Sheets-Sheet 1
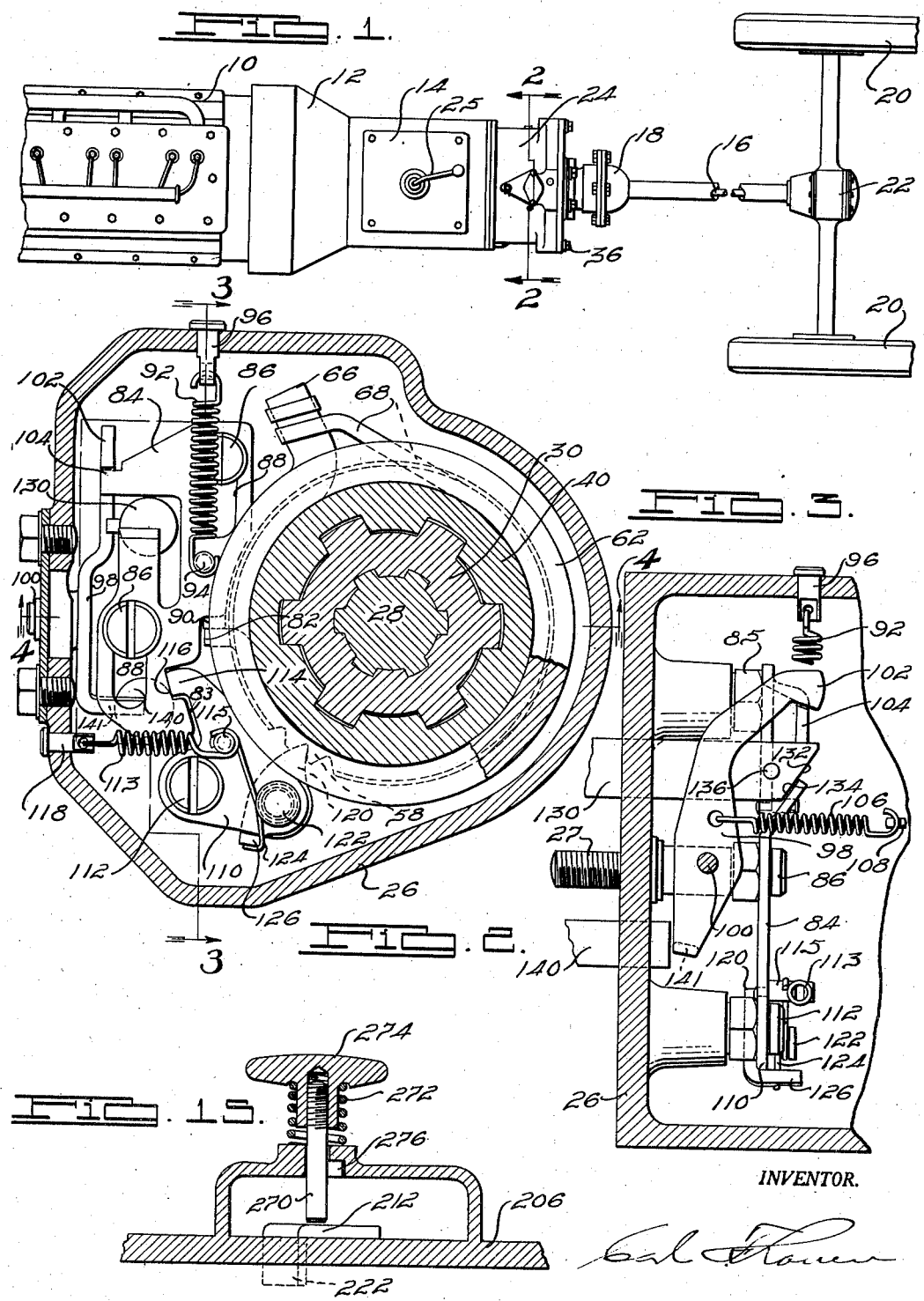
INVENTOR.

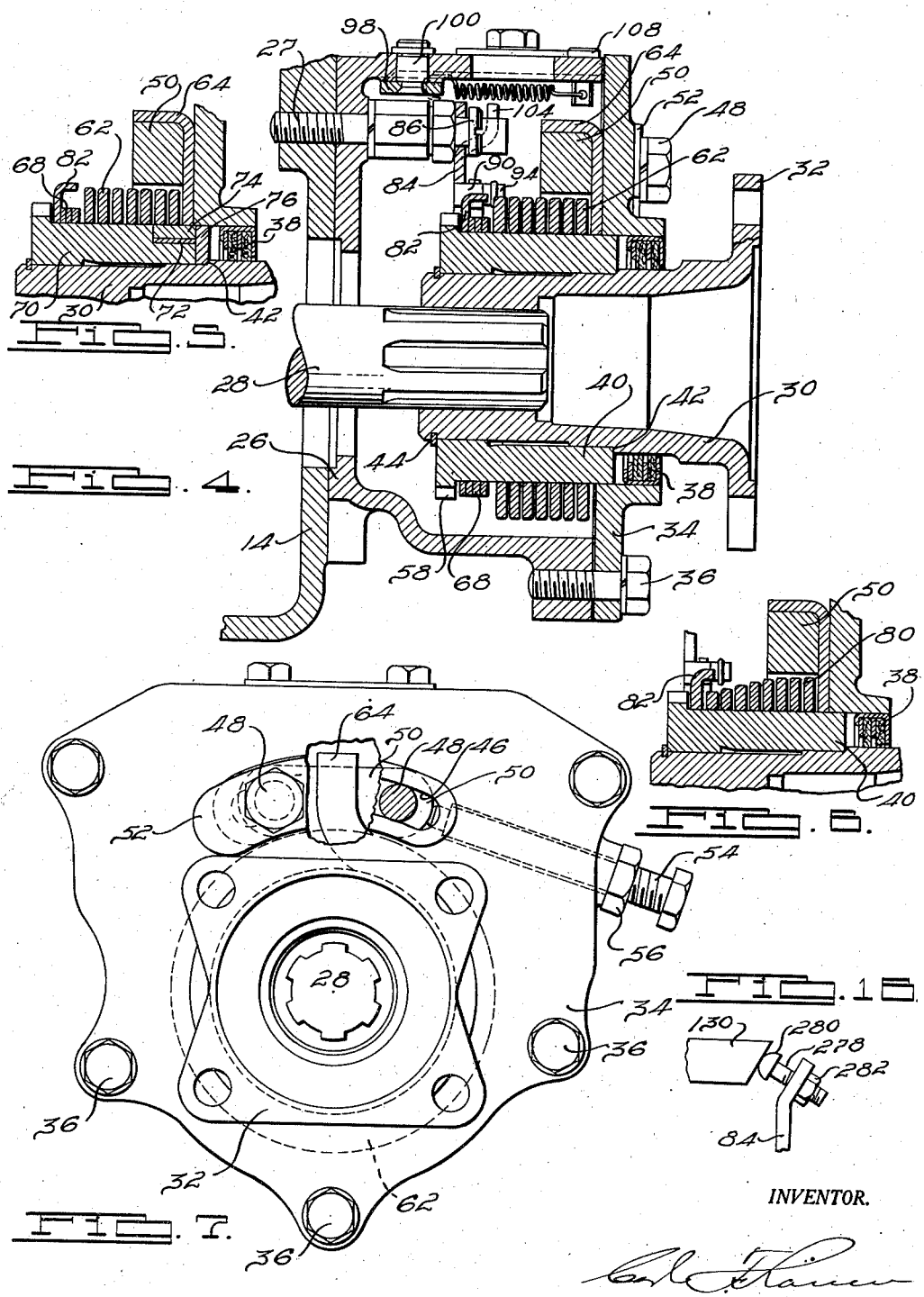

July 12, 1938.  C. F. RAUEN  2,123,202
SPRAG CLUTCH
Filed Feb. 6, 1935   4 Sheets-Sheet 3
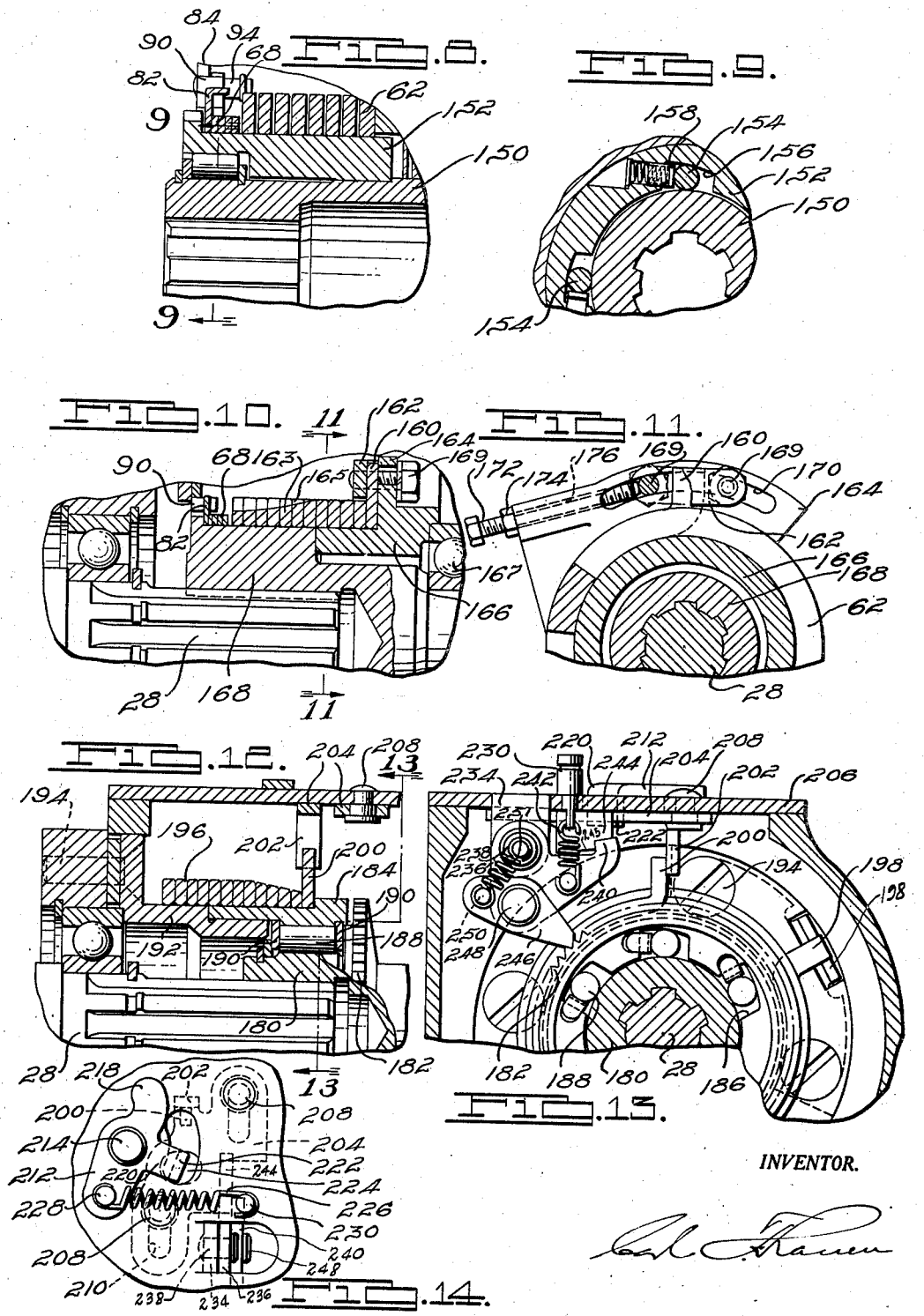
INVENTOR.

July 12, 1938.  C. F. RAUEN  2,123,202
SPRAG CLUTCH
Filed Feb. 6, 1935   4 Sheets-Sheet 4
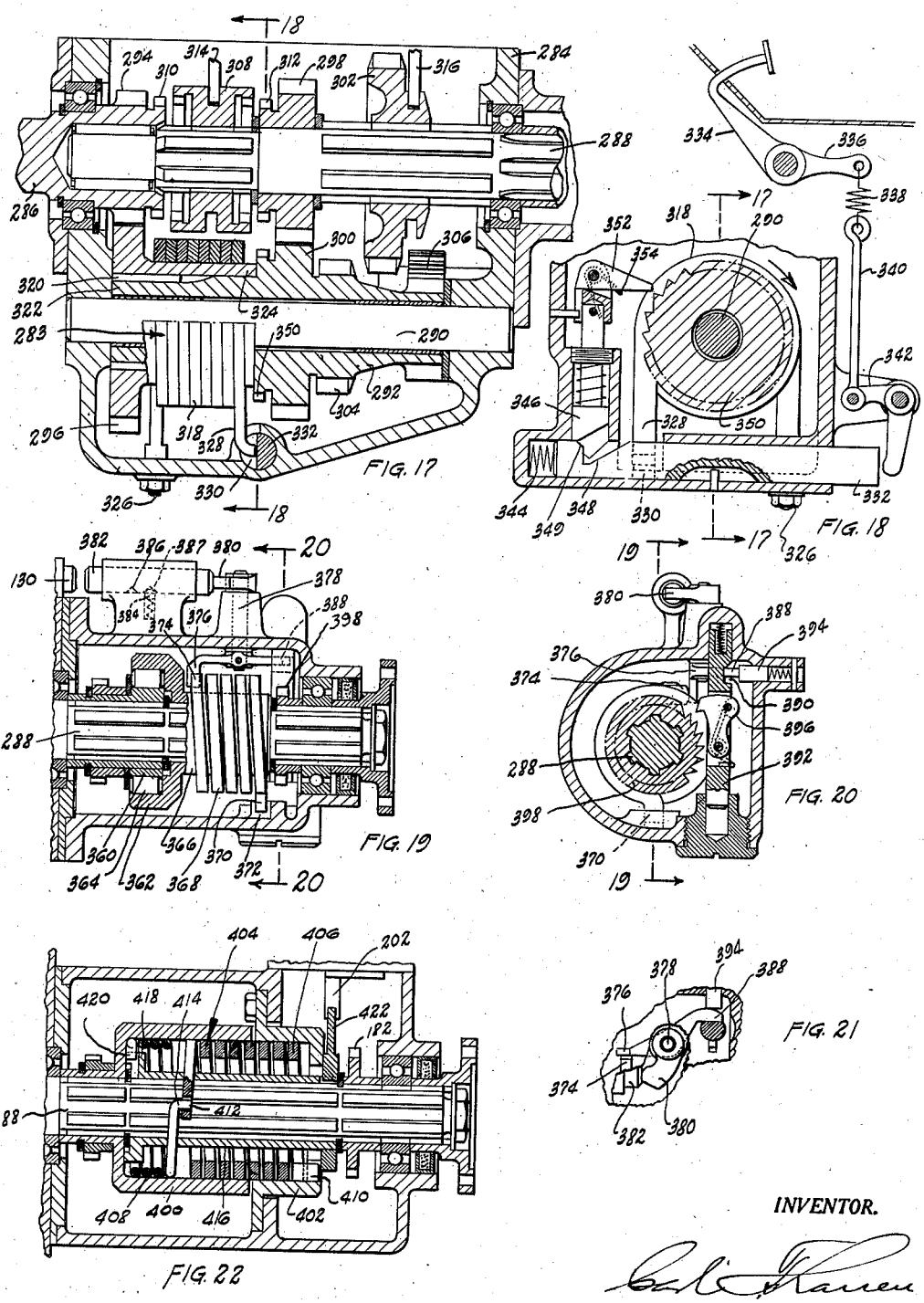
INVENTOR.

Patented July 12, 1938

2,123,202

UNITED STATES PATENT OFFICE 2,123,202

SPRAG CLUTCH

Carl F. Rauen, Grosse Pointe, Mich.

Application February 6, 1935, Serial No. 5,186

44 Claims. (Cl. 192—4)

The application is a continuation in part of an application for patent on Means for preventing retrograde movement of motor vehicles, filed by me on October 29, 1930, and identified by Serial No. 491,837.

This invention, in general, relates to sprag clutches or brake devices and in particular to automatic safety brakes for preventing undesirable rotation of a power shaft.

In the embodiment selected for purposes of illustrating the invention, such a device is disclosed as applied to the power shaft of an automotive vehicle for preventing undesirable movement thereof such as that which may be imparted thereto by gravity. As incorporated in an automotive vehicle, the braking device is designed to operate and to be released incidental to the operation of certain devices, such as a selective variable speed power transmitting mechanism, which now are in common use on automotive vehicles. It should clearly be understood, however, that the braking device, per se, may be used in any installation where it is expedient to prevent undesirable rotation of shafts or other rotating bodies and may, if it appears to be desirable, be equipped with separate direct control mechanism.

The braking device which has been selected to illustrate the invention comprises, in general, a casing adapted to be secured to the rear end of a transmission housing and about the propeller shaft leading from the same, a one-way clutch mechanism having one part thereof fixed to the casing and against rotation and the other part thereof fixed to the propeller shaft to rotate therewith, a one-way clutch element operable for permitting the part affixed to the propeller shaft to overrun the part affixed to the casing in one direction only, and to prevent overrunning in the other direction whereby the propeller shaft will be held against rotation in such direction, with mechanism operable by a shifter rod of the transmission for releasing said one-way clutch element when it is desired to drive the car in one direction and operable for resetting the one-way clutch element when the shifter rod has been moved to set the transmission in a forward low gear ratio and after the car has been moved forwardly in such gear ratio driving connection.

This invention has as an object thereof the provision of a safety brake mechanism or device which embodies a relatively simple design, which is compact and which does not require a great amount of space along the axis of the propeller shaft.

Another object of this invention is to provide a safety brake which is automatic in operation, which does not require the use of conscious effort on the part of the operator of the vehicle in which this device is incorporated, and which is foolproof in operation.

Another object of this invention is to provide a safety brake which is self-energizing and in which the friction due to overrunning of the parts thereof has been reduced to such an extent that very little heat is created during operation of the vehicle, thereby reducing wear on the parts of the device to prolong the dependable usefulness thereof.

Another object of the invention is to provide a safety brake which is automatically operable to prevent undesirable rearward movement of a vehicle and which may be released under load or otherwise when it is desired to drive or to permit coasting movement of the vehicle rearwardly.

Another object of the invention is to provide a safety brake which is operable to prevent rearward movement of a vehicle in which the device is incorporated except at such times as it is desirable.

Another object of the invention is to provide a safety brake for preventing undesirable rearward movement of a vehicle in which the device is incorporated which may be released for driving the vehicle rearwardly, with means for resetting the device upon movement of the shift lever of the transmission to a forward speed drive and forward motion of the vehicle through such drive.

Other objects and advantages of the invention will appear from a reference to the following specification and the accompanying drawings, of which there are four sheets and in which:

Fig. 1 is a more or less diagrammatic plan view of a portion of an automotive vehicle illustrating the application of a device embodying the invention thereto;

Fig. 2 is a vertical cross sectional view of a device embracing the invention, taken in a plane on the line 2—2 of Fig. 1 and showing the device in released position;

Fig. 3 is a top plan view of the control mechanism for the safety brake as would appear if the top portion of the case therefor were removed and taken generally on the line 3—3 of Fig. 2;

Fig. 4 is a vertical longitudinal sectional view of a device embracing the invention and taken in a plane on the line 4—4 of Fig. 2;

Fig. 5 is a sectional view of a portion of the device embracing the invention and illustrating a modification thereof;

Fig. 6 is a sectional view of a portion of the device embracing the invention and illustrating another modification thereof;

Fig. 7 is a rear elevational view of the device with certain parts being broken away;

Fig. 8 is a longitudinal sectional view of a portion of a device embracing a modified form of the invention;

Fig. 9 is a vertical cross sectional view taken in a plane on the line 9—9 of Fig. 8;

Fig. 10 is a longitudinal sectional view of a portion of a device embracing another modification of the invention;

Fig. 11 is a vertical cross sectional view of the device, illustrated in Fig. 10, taken in a plane on the line 11—11 thereof;

Fig. 12 is a partial longitudinal sectional view of a further modification of the invention;

Fig. 13 is an elevational view partly in section of the modified form of the invention illustrated in Fig. 12 and showing the control mechanism therefor and taken generally on the line 13—13 of Fig. 12;

Fig. 14 is a top plan view of the control mechanism for the modified form of device illustrated in Figs. 12 and 13.

Fig. 15 is a view of a manual control which optionally may be used in connection with the safety brake device, as shown in Fig. 13;

Fig. 16 is a view of a detail modification such as may be used in connection with any of the devices illustrated in the drawings, and Fig. 17 is a longitudinal sectional view of a transmission illustrating the application of a device embodying the invention to a unidirectional shaft thereof.

Fig. 18 is a sectional view taken in a plane on the line 18—18 of Fig. 17, looking in the direction of the arrows, illustrating the details of the releasing mechanism for the device disclosed in Fig. 17.

Fig. 19 is a sectional view of another form of the invention applied to the tail shaft of the transmission.

Fig. 20 is a section on line 20—20 of Fig. 19.

Fig. 21 is a plan view of a portion of the mechanism illustrated in Fig. 20.

Fig. 22 is a sectional view of another form of a device embodying the invention.

Referring now to Figs. 1 to 4, inclusive, and 7, there is disclosed a preferred form of the invention as applied to an automotive vehicle having an engine 10, a housing-enclosed clutch mechanism 12, a variable speed power transmitting mechanism 14, a propeller shaft 16 operatively connected through a universal joint mechanism 18 with the variable speed power transmitting mechanism 14 and with road wheels 20 through a suitable differential 22. The invention is embodied in a device 24 which may be termed a safety brake and which is disposed rearwardly of the transmission 14 and ahead of the universal joint mechanism 18. To enable the operator of the vehicle to effect selective changes in the gear ratio through the variable speed power transmitting mechanism, there is provided a shift lever 25.

An open-sided casing 26 may be secured such as by stud bolt 27 to the rear wall of the transmission 14 and about the driven shaft thereof projecting rearwardly therefrom. A coupling sleeve 30, internally splined at one end thereof, is fitted to a splined portion of the driven shaft 28 so as to rotate therewith and is adapted to provide a flanged portion 32 for connecting the sleeve 30 to the universal joint mechanism 18.

The open side of the casing 26 may be closed by a plate 34, secured by stud bolts such as 36, threaded into suitable openings in the casing 26. The sleeve 30 extends through a central opening in the plate 34. An oil seal 38 is disposed within the opening and about the sleeve 30 for sealing the casing against loss of oil.

An internally splined sleeve 40 is fitted over an externally splined end portion of the sleeve 30 and between a shoulder 42 externally formed thereon and a snap ring 44 so that the sleeve 40 will be secured to and will rotate with the driven shaft 28, which, through sleeve 30 and universal joint mechanism 18 is connected to road wheels 20 of the vehicle. It will be apparent, therefore, that rotation of the road wheels 20 of the vehicle will, through such instrumentalities, effect a rotation of the sleeve 40 in a direction depending upon the direction of rotation of the road wheels 20.

The plate 34 above the central opening therein, is provided with a pair of slotted openings 46 which accommodate stud bolts 48 threaded into a block 50 which is thereby adjustably secured within the casing 26 and above the sleeve 40. A plate 52 having spaced openings therein for accommodating the shanks of the stud bolts 48 is disposed externally of the plate 34 for closing the slots 46 and between the plate 34 and the head of the stud bolts 48. Before the stud bolts 48 are threaded into the block 50 so as to secure the same to the plate 34, the block 50 may be shifted laterally for a purpose hereinafter described. An adjusting bolt 54, threaded into an opening in the side wall of the casing 26 and locked in position by a lock nut 56, is adapted at its end to engage with a portion of the block 50 to aid in securing the same against displacement.

The sleeve 40 at one end thereof is externally provided with a set of radial teeth 58 and between which and the plate 34 the sleeve 40 is provided with a smooth cylindrical clutching surface. A relatively heavy coil spring 62 having an internal diameter slightly greater than the external diameter of the sleeve 40 is telescopically disposed about the same so that there is practically no frictional engagement between the spring and the sleeve. One end of the coil spring 62 is turned upwardly and passes through a slot provided in the block 50 between the same and the plate 34 and at the top of the block 50 is bent forwardly as at 64 for the purpose of securing the coil spring in position and against rotation. The free end of the coil spring 62 is turned outwardly as at 66 and provides a support for a relatively light coil spring 68, the end of which is secured to the coil spring 62 by being wrapped around the turned-out portion 66. The coil spring 68 is relatively light in comparison to the coil spring 62 and has a normal internal diameter slightly less than the external diameter of the sleeve 40, so that there is a slight frictional engagement between the coils of the spring 68 and the external cylindrical surface of the sleeve 40. The coil spring 68 has a cross sectional area substantially less than that of the coil spring 62 so as to be more resilient and so that when relative movement between the coil spring 68 and the sleeve 40 occurs, the frictional drag will be relatively small, with the result that very little heat will be generated thereby. Both of the coil springs 62 and 68 are coiled in the same manner so that movement of the free end thereof about the sleeve 40 in one direction will tend to expand the springs and increase the internal diameter thereof, and movement in the other direction will tend to contract the springs and to decrease the internal diameter thereof, in the latter event the springs will wrap up around the external cylindrical surface of the sleeve 40 in close frictional engagement therewith and prevent rotation of the sleeve in one direction.

The relatively light coil spring 68, which has one end thereof affixed to the free end of the coil spring 62, is in slight frictional engagement with the external surface of the sleeve 40 and is adapted to act as an energizing spring for the coil spring 62 so that when the sleeve 40 rotates in a direction which would tend to wind up the spring, the frictional engagement between the coil spring 68 and the external cylindrical surface of the sleeve 40 will be sufficient to tension the coils of the spring 68 and bring the same tightly into frictional engagement with the external surface of the sleeve 40 as a result of which the internal diameter of the coil spring 62 will be diminished to bring the same into engagement with the external surface of the sleeve 40, whereby the sleeve will be held against further rotation in that direction and thereby will be locked to the casing 26 for preventing further rotation of the shaft 28 in such direction.

The springs 62 and 68 are coiled so that when the vehicle is moving in a forward direction the shaft 28 and the sleeve 40 carried thereby will be rotating in a direction which will tend to unwind the springs 62 and 68. At such time the sleeve 40 will merely overrun the coil spring 68. Movement of the vehicle in a rearward direction, however, is adapted to rotate the shaft 28 and sleeve 40 carried thereby in a direction such that the springs 62 and 68 will be wrapped up and brought into tight frictional engagement with the external surface of the sleeve 40. In manufacture, the springs 62 and 68, after the same are coiled, are ground to provide a true cylindrical internal surface therefor so that the internal surface of the larger coil spring 62 may be disposed concentric with the external surface of sleeve 40 and be slightly spaced therefrom.

In Fig. 5 there is shown a modified form of a sleeve 70 in which one end thereof is reduced to accommodate a bushing 72 of bearing material such as bronze, and a freely rotatable bushing 74, which is confined in place by a washer 76 which is disposed between the shoulder 42 and the end of the sleeve 70. The block 50, which is laterally adjustable, is so for the purpose of adjusting the position of the free end of the energizing spring 68. In practice, when adjustments of the block 50 are made, the edge of the first coil of the main spring 62 sometimes becomes displaced and drags on the external surface of the sleeve, with the result that the same will become grooved. The bushing 74, which is freely rotatable on the sleeve 70, will be held against rotation by the first coil of the spring 62 if the same is displaced from its normal position. In this manner the grooving of the external surface of the sleeve 40 can be avoided.

In Fig. 6 there is shown a modified form of clutch spring in which a single spring 80, similar to spring 62, is used and secured in the same manner. The coils at the free end of the spring, however, are reduced in cross sectional area so as to weaken the same, whereby such coils will be more resilient than the coils at the fixed end of the spring 80. The cross sectional area of the coils of the free end of the spring 80 may be reduced by grinding away part of the external surface of the same, or in any other suitable way.

The free end of the energizing spring 68, as well as the free end of the spring 80 which may be considered as an energizing portion, is turned upwardly and bent over to provide an abutment 82, whereby the internal diameter of the energizing portion of the spring may be expanded to take it out of operative frictional engagement with the outer cylindrical surface of the sleeve 40, so that a vehicle in which the device is incorporated may be driven rearwardly.

For the purpose of expanding the internal diameter of the springs 62 and 68 when it is desired to drive the car rearwardly, there is provided a control mechanism associated with the shifter rod of the transmission mechanism 14, which is operated by the manually controlled shift lever 25. A plate 84 is slidably affixed to the inner end wall of the casing 26 by a plurality of shoulder screws 86, the end of one of which is threadedly secured in a suitable opening provided in the head of bolt 27 which secures the casing 26 to the rear end of the transmission casing 14 and the other of which is threadedly secured in a suitable opening provided in a member 85. The shanks of the screws 86, which are of larger diameter than the threads, pass through the slotted openings 88 in the slidable plates 84, and the heads of the screws 86 confine the plate to sliding movement between the heads of the screws 86 and the heads of the bolt 27 and the member 85.

The slidable plate 84 is provided with a lobe 90 which is adapted to engage the abutment 82 of the energizing spring or energizing portion, there preferably being but a very small clearance between these two members. The tension spring 92 provided with a hook portion at both ends, one of which is hooked over a pin 94 carried by the slidable plate 84 and the other of which is hooked through an aperture provided in a pin 96 carried in the wall of the casing 26, biases slidable plate 84 to a position where the lobe 90 is out of contact with the end portion 82 of the energizing spring.

The plate 84 is locked in released position in which it is shown in Figs. 2, 3, and 4 by a hook-shaped lever 98 pivotally mounted on a vertical pin 100 carried by the top wall of the casing 26 and for movement in a horizontal plane.

The lever 98 at one end is provided with a head 102 which is adapted to be moved into the path of a lug 104 formed on the slidable plate 84. A spring 106, the ends of which are hook-shaped and one end of which is hooked through an aperture in the lever 98 and the other of which is hooked through an aperture provided by a pin 108 depending from an upper wall of the casing 26, biases the lever 98 so that the head 102 thereof will lie in the path of the lug 104 provided on the plate 84 to assist in preventing the movement of the plate 84 to its other position, looking at Figs. 2 and 3.

A lever 110 pivotally secured such as by a shoulder screw 112 at one end is provided with a latch 114 which is adapted to engage in a notch 116 provided in the slidable plate 84 for the purpose of holding the slidable plate 84 against movement to its other position under the influence of the spring 92 and the energizing portion of the clutch coil spring. A spring 113, hooked at both ends, one of which is hooked on to a pin 115 carried by the lever 110 and the other end of which is hooked on to a pin 118 carried by the casing 26, biases the latch 114 into the notch 116. The lever 110 has pivotally secured thereto a pawl 120, which is adapted when the shaft 28 and the sleeve 40 carried thereby are rotating in a counter-clockwise direction, looking at Fig. 2, to pull the latch 114 out of engagement with the notch 116 whereupon the plate 84 moves to the right and the latch 114 will contact with a portion 83 of plate 84 for holding the pawl 120 out of engagement with teeth 58. The pawl 120 is pivotally secured as at 122 to the lever 110 and is biased by a spring 124 to hold the flange 126 of the pawl 120 in engagement with a side edge of the lever 110. When the shaft 28 and sleeve 40 connected thereto are rotating in a clockwise direction, looking at Fig. 2, the pawl 120 is adapted to ratchet over the teeth 58 provided on one end of the sleeve 40.

As shown in Figs. 2, 3, and 4, the control mechanism is set so that the lug 90 carried by the slidable plate 84 has moved the abutment 82 of the energizing spring to release the same from frictional engagement with the sleeve 40 so that the device in the position in which it is in will not operate to hold the vehicle against undesirable rearward movement. When the slidable plate 84 is moved to the right under the influence of spring 92, the lug 90 will be moved out of engagement with the end portion 82 of the energizing spring, and the device will be set to hold the vehicle against undesirable rearward movement. In order for the slidable plate 84 to move to the right, looking at Fig. 2, to set the device to operate, it is necessary that the latch 114 be moved out of the notch 116 and the head 102 of the lever be moved out of the path of the lug 104 of the slidable plate 84.

The shifter rods of the transmission mechanism 14, which are moved along their axes by manipulation of the shift lever 25, are adapted to actuate the controlling mechanism for the braking device. A shifter rod 130, which is used for effecting a reverse and low gear ratio, projects through the end wall of the casing 26 and is provided with a cam surface 132 for engagement with a cooperating cam surface 134 provided by a portion of the slidable plate 84 so that when the shifter rod 130 is moved rearwardly, the cam surfaces 132 and 134 will cooperate to shift the slidable plate 84 to the position in which it is shown in Figs. 2 and 3. Movement of the slidable plate 84 to the position in which it is shown in Figs. 2 and 3, will move the lug 90 to contact with the abutment 82 of the energizing spring to expand the same out of locking frictional engagement with the outer cylindrical surface of the sleeve 40. When the slidable plate 84 is moved to this position, the spring 106 biases lever 98 so that the head 102 thereof is moved in the path of the lug 104 of the plate 84 and spring 113 biases the lever 110 so that the latch 114 is moved into the notch 116 whereby the slidable plate 84 is latched in its leftmost position.

The shifter rod 130 is provided on the upper surface thereof with a pin 136, which is adapted to engage the lever 98 between the pivot point thereof and the head 102 so that when the shifter rod 130 is moved forwardly from neutral to set the transmission for low gear, the lever head 102 will be pulled out of the path of the lug 104. The pin 136 will not engage lever 98 upon movement of shift rod 130 from reverse to neutral position. The energizing spring, as well as the main spring 62, will still, however, be inoperative for preventing the rearward movement of the vehicle when the transmission is set for low gear, since the latch 114 is in engagement with the notch 116.

However, movement of the car forwardly, by means of the driving connection established through the low gear, will rotate the sleeve 40 in a counter-clockwise direction, looking at Fig. 2, which will cause the teeth 58, acting on the pawl 120 and the lever 110, to pull the latch 114 out of engagement with the notch 116, whereby the spring 92 will move the slidable plate 84 to the right, and the lug 90 out of engagement with the end portion 82 of the energizing spring 68, whereupon the clutch springs 68 and 62 will be operative for preventing undesirable rearward movement of the vehicle. A shifter rod 140 of the transmission, used for selecting second and high gear ratios, is operable when moved rearwardly to select a second gear drive to engage one end 141 of the lever 98 so that the lever head 102 will be moved out of the path of the lug 104 the same as if the shifter rod 130 were moved forwardly to select a low gear drive which would cause pin 136 to engage a central portion of the lever 98 and swing the same about its pivot.

It will be observed, therefore, that after a vehicle in which the safety brake device has been incorporated has been driven rearwardly through the agency of a reverse gear drive, the coil springs 68 and 62 will be inoperative to prevent a clockwise rotation of the shaft 28 and sleeve 40 and hence the braking action of the device will at such time be eliminated. Subsequent to shifting to reverse or driving the vehicle rearwardly through the reverse gear of the transmission, the shift lever 26 thereof may be moved to a neutral position without effecting a resetting of the coil spring because even though the shift rod 130 is moved forwardly to a neutral position, the head 102 of the lever 98 will lie in the path of the lug 104 until the transmission is set for low or second gear drives. Even though the transmission may be set for a low or second gear drive while the car may be coasting rearwardly after having been driven through the reverse gear, the clutch springs 68 and 62 cannot be reset until the vehicle is moved forwardly so that the action of the teeth 58 upon the pawl 120 will cause the lever 110 to withdraw the latch 114 from engagement with the slidable plate 84 through notch 116.

Should it be desired to push a vehicle having a safety brake embodying this invention rearwardly, it normally could not be done on account of the safety brake which would prevent the rearward movement of the vehicle. The safety brake may be released for such purpose by moving the shift lever to reverse position and moving it back to neutral which, in effect, would neutralize or lock out the safety brake. If the vehicle is being driven rearwardly through the reverse gear of the transmission and while the vehicle continues in its rearward movement, the shift lever 25 of the transmission may be moved to a neutral or forward gear position without immediately setting the safety brake which otherwise would immediately lock the shaft 28 against rotation, which would place an undue strain upon the parts of the driving gear of the vehicle and the safety device and probably cause breakage.

When the vehicle is being driven forwardly, an overrunning action will take place between the outer cylindrical surface of the sleeve 40 and the clutch springs 68 and 62, and since there is a slight amount of frictional drag between the clutch spring 68 and the sleeve 40, both of the parts will be subjected to wear at the point of engagement. To eliminate this overrunning of the clutch springs by the sleeve 40, the coupling sleeve 30, which is splined to the driven shaft 28 of the transmission, may be provided with a smooth outer cylindrical surface and may comprise the driving element 150 of a roller type overrunning clutch, the driven element of which may be provided by the sleeve 40. In Figs. 8 and 9 such a construction is shown wherein the driving element 150, which is the coupling sleeve, is provided with a cylindrical outer surface which fits within the cylindrical inner surface of the driven element 152 and between which elements a series of annularly spaced rollers 154 are disposed in eccentric raceways 156 provided by relatively inclined cam surfaces of the elements 150 and 152.

Each of the rollers 154 is backed by a spring-pressed shoe 158 which biases the roller 154 toward the shallower end of the raceway wherein it may be wedged between the surfaces thereof to lock the members 150 and 152 against relative rotation in one direction when the member 150 tends to rotate in a clockwise direction, looking at Fig. 9.

It will be appreciated, however, that the sleeve 152, when it tends to rotate in a clockwise direction, looking at Fig. 9, will tend to wrap up the clutch springs 68 and 62, with the result that such sleeve 152 will be locked to the casing 26 of the safety brake against rotation. Consequently, the sleeve 150, to which the shaft 28 is connected, will be held against rotation since the rollers 154 will move into the shallower portions of the raceways 156 to wedge between the surfaces of the sleeve 150 and the sleeve 152. However, when the sleeve 150 rotates in a counter-clockwise direction, such as occurs when the vehicle is moving forwardly, the rollers 154 will be moved out of the shallower ends of the raceways 156 and will permit the sleeve 150 to rotate counter-clockwise without carrying the sleeve 152 along with it, as a result of which the sleeve 152 will tend to remain stationary, in which event the sleeve 152 would not overrun with respect to the clutch springs 68 and 62, whereby the major portion of the wearing which results from the overrunning of the clutch springs on the outer cylindrical surface of the sleeve or drum 152 would be eliminated.

In Figs. 10 and 11, wherein a modified form of the invention is disclosed, the main clutch spring 163 has one end thereof turned outwardly as at 160, whereby the same may be secured between a plate 162 and a peripheral flange 164 provided on a drum-shaped sleeve 166 and may be provided with an energizing spring such as 68. The end coils of spring 163 may be provided with a plurality of annularly spaced slots or grooves 165 for rendering the free end of the main spring portion more resilient. Stud bolts 169, passing through suitable openings in the plate 162 and slotted openings 170 in the flange 164, may be utilized for securing the end 160 of the clutch spring 163 in position and whereby the same may be adjusted either to the right or left of the position shown in Fig. 11. An adjusting bolt 172, secured against displacement by a lock nut 174 and threaded into a bore 176 provided in the peripheral flange 164, at one end abuts the shank of one of the bolts 169 for assisting in resisting the displacement on the end 160 of the clutch spring 163 when the same becomes operative to lock the shaft 28 against reverse rotation. The clutch spring 163 is coiled around the outer cylindrical surface of the drum 166 and has an internal diameter slightly greater than the outside diameter of drum 166 and is positioned so that the internal surface of the clutch spring 163 is spaced slightly from the outer cylindrical surface of the drum 166 when the parts of the device are not under stress. The remaining portion of the clutch spring 163, as well as the energizing spring 68, one end of which is connected to the free end of the clutch spring 163 as previously described, is coiled about the outer cylindrical surface of a sleeve 168 which is connected to rotate with the propeller shaft and which is internally splined so as to be rotatable with the driven shaft 28 of the transmission mechanism 14. It will be noted that bearing 167 is operatively disposed between the two clutch drums 166 and 168 and is adapted to align the clutching surfaces thereof.

In a device embodying this construction, the overrunning will take place between the outer cylindrical surface of the sleeve 168 and the internal surface of the energizing spring 68 and those coils of the clutch spring 163 which are disposed about the sleeve 168. This modified form of the device may be controlled by the same mechanism as is disclosed for controlling the embodiments disclosed in Figs. 2, 3, and 4, and if so controlled, will operate in exactly the same way as is set forth for the embodiments disclosed in such Figs. 2, 3, and 4.

In Figs. 12 to 14, inclusive, there is illustrated a further modification of the invention wherein the driven shaft 28 has splined thereto a coupling sleeve 180, which is provided with a radial set of teeth 182 and which is adapted to form the driving element of an overrunning clutch of the roller type. The driven element 184 is in the form of a sleeve, which surrounds the driving element 182, and is provided with a series of annularly spaced internal grooves 186 in each of which there is disposed a roller 188. The grooves 186 are adapted to provide eccentric raceways about the driving element 180, and the rollers 188 are biased into the restricted portion of such raceways to wedge between the opposing surfaces thereof for the purpose of locking the driven member 184 to the driving member 180 when the driving member 180 is rotating in a clockwise direction, looking at Fig. 13.

When the driving member 180 is rotating in a counter-clockwise direction, the driven member 184 will not be rotated therewith as the rollers 188 will be forced into the enlarged portion of the raceways where they will be inoperative to wedge between the opposing surfaces of the driving and driven members. When a vehicle in which a device of this type has been incorporated is being driven forwardly, the driven shaft 28 and the driving element 180 of the overrunning clutch will be rotating in a counter-clockwise direction. Suitable washers 190 are provided for retaining the rollers 188 in position between the opposing surfaces of the driving and driven members of the overrunning clutch.

The outer surface of the driven member 184 is cylindrical, substantially the same diameter, and concentric with a sleeve 192 which is fixedly secured such as by bolts 194 to the rear wall of the transmission casing behind which the safety brake may be installed or to any other suitable fixed support. A coil spring 196 comprising a plurality of turns has one end 198 thereof suitably fixed to a stop 199 for anchoring the same and has an inner surface concentric with that of the sleeves 184 and 192 about which the turns are disposed. One end of the coil spring 196 may have an internal diameter slightly less than the outside diameter of sleeve 192 and may be formed of wire having a cross sectional area less than that of the main spring portion so as to render the tapered end of said coil more resilient. This may be accomplished by grinding a taper on the outside diameter of the coil spring after the same has been formed. The free end of the spring 196, which is adjacent the tapered end, is provided with an outwardly turned portion 200 which is adapted to be acted upon by a member 202 for increasing the internal diameter of the coil spring 196 and moving the same out of frictional engagement with the outer cylindrical surfaces of the sleeves 184 and 192.

The lug 202 for engaging the end 200 of the spring 196 is provided by a struck-out portion of a slidable plate 204, which is carried by the cover of the casing 206 and secured in sliding relation thereto by a plurality of pins 208 carried by the cover and the shanks of which pass through slotted openings 210 provided in the plate 204. A bell crank lever 212 is pivotally secured at 214 to the upper side of the cover 206 and is provided with an arm 218, which is adapted to be engaged by a shifter rod of the transmission mechanism such as 130 (see Fig. 3), when the transmission is set for reverse gear, for moving the bell crank lever 212 in a clockwise direction about its pivot 214. The lever is provided with an arm 220 having a downwardly projecting flange 222 which extends through an opening in the cover 206 of the casing and into an opening 224 in the slidable plate 204 so that the plate will be shifted laterally when the lever 212 is moved about its pivot 214. A spring 226 at one end is secured to a pin 228 carried by the lever 212 and at the other end to a pin 230 carried by the cover 206 for the purpose of biasing the lever 212 for movement in a counter-clockwise direction.

As shown in Figs. 12, 13, and 14, the safety brake is released on account of the fact that the lug 202 carried by the slidable plate 204 is holding the end 200 on the coil spring 196 in a position where the spring is expanded so that it is not in operative frictional engagement with the outer cylindrical surface of the sleeve 184 and 192. The cover 206 is provided with a downwardly projecting lug 234 upon which there is pivotally secured a lever 236 by a pin 238 and which lever is provided with a latch portion 240 which is biased by a spring 242 secured at one end to the lever 236 and at the other end to the bottom portion of the pin 230 to engage a lug 244 provided on the slidable plate 204 and for the purpose of holding the same against movement under the influence of springs 226 and 196.

The latch portion 240 is adapted to be moved out of engagement with the lug 244 to permit movement of the plate 204 to the right, looking at Fig. 13, by a pawl 246, pivotally secured as at 248 to the lever 236 and cooperable with a radial set of teeth 182 carried by the coupling sleeve 180 so that when the shaft 28 and the sleeve 180 carried thereby are rotating in a counter-clockwise direction, looking at Fig. 13, the teeth 182, acting upon the pawl 246, and the pin 250 carried thereby, which engages one side of the lever 236, will pull the latch portion 240 out of engagement with the lug 244 and against the tension of spring 242, whereupon plate 204 will be moved to the right under the influence of springs 226 and 196 to release the end 200 of the clutch spring 196 so that when the sleeve 184 is rotated in a clockwise direction it will wrap up the spring 196 on account of the frictional engagement between the tapered end of the spring and the outer cylindrical surface of the sleeve, whereby the sleeve 184 will be locked against rotation with the sleeve 192, and since the sleeve 184 at such time will, through the overrunning clutch mechanism, be connected to the driven shaft 28, will prevent rearward movement of the vehicle. A spring 251, hooked over extensions of pins 250 and 238, biases pawl 246 into engagement with ratchet teeth 182.

It will be understood, of course, that before the end 200 of the clutch spring 196 can be released from engagement with the lug 202 that the shift lever of the transmission must be moved out of reverse gear to permit the spring 226 to move lever 212 about its pivot whenever the latch 240 is disengaged from the lug 244.

It will be seen, therefore, that when the shift lever of the transmission has been manipulated to set the transmission for reverse drive that the clutch spring 196 will be released from frictional engagement with the sleeve 184 and the shaft 28 will be free to drive the vehicle rearwardly. When the shift lever is returned to neutral position, the clutch spring 196 will not be reset until the lug 244 is released from engagement with the keeper 240, which is accomplished by movement of the vehicle in a forward direction.

To prevent the resetting of the clutch spring when the vehicle is moved forwardly, there may be provided a manual control for locking out the clutch spring 196 and which comprises a slidable pin 270 mounted for vertical reciprocation in a wall provided by a portion of the cover 206 and which is adapted to be dropped into the opening in the cover 206 through which the flange 222 extends, for securing the lever 212 against movement about its pivot when the same is in the position illustrated in Fig. 14. Normally, the pin 270 may be in the position illustrated in Fig. 15 in which it is biased to an uppermost position by a spring 272 which is confined between a portion of the cover 206 and a knob 274 threadedly secured to the upper end of the pin 270. The pin 270 is provided with a lug 276 which is adapted to engage the portion of the cover 206 around the bore through which the pin 270 projects, for holding the same in its lowermost position and against the cover 212. Thus, the operation of the coil spring 196 may be locked out for such period as it may appear desirable, although ordinarily it will be unnecessary to do this since the operation of the clutch spring 196 is controlled incidental to the operation of the transmission mechanism, which ordinarily will be sufficient.

It is evident that the manual control may be utilized in connection with all of the modifications of the invention if such should appear desirable.

After latch 240 is pulled out of engagement with lug 244, the cammed surface 245 thereof engages the edge of latch 240 for the purpose of holding pawl 246 out of engagement with ratchet teeth 182 during forward or counter-clockwise rotation of shaft 28.

In Fig. 16 there is disclosed an adjustment for the plate 84 which comprises a bolt 278 having a rounded head 280 engageable with the tapered end of shift rod 130 and a lock nut 282 for securing bolt 278 in place. It is necessary during assembly to make adjustments to compensate for inaccuracies in manufacture, and the adjustable bolt 278 provides an expedient means for correlating the movements of shift rod 130 and plate 84.

In Figs. 17 and 18 there is illustrated another modification of the invention in which the safety brake mechanism, indicated generally at 283, has been built into a transmission mechanism 284, and which transmission mechanism includes a driving shaft 286, a driven shaft 288, a fixed countershaft 290 upon which a gear cluster 292 is rotatably mounted, a stem gear 294 on the drive shaft constantly in mesh with gear 296 of the cluster 292, a gear 298 rotatably mounted on driven shaft 288 constantly in mesh with gear 300 of cluster 292, a slidable gear 302 splined to the driven shaft 288 and selectively engageable with gear 304 to provide a low speed forward drive and with idler gear 306 to provide a reverse drive and a shiftable clutch member 308 selectively engageable with clutch members 310 and 312, respectively, to provide direct and intermediate or second speed forward drives. The clutch member 308 and gear 302 are manually movable by shifter forks 314 and 316, respectively, which are carried by shifter rods such as 140 and 130 and which are selectively movable by shift lever 25 to set up a reverse and a low, a second and a direct forward drive.

The clutch spring 318 of the safety brake mechanism 283 is mounted between the countershaft gears 296 and 300. Gear 296 is keyed at 320 to the extension or hub 322 of gear 300. Spring 318 may have an internal diameter slightly less than the external diameter of the drum 324 about which it is disposed and which drum is integral with gear 296. One end of spring 296 is anchored to the transmission case by a suitable adjustable means 326. The other or free end 328 of spring 296 is adapted to be received in a notch 330 of a slidable bar 332, as may better be seen by an inspection of Fig. 18, which figure is a sectional view of the mechanism illustrated in Fig. 17 and taken in a plane along the line 18—18 thereof, looking in the direction of the arrows.

Whether the vehicle is power driven forwardly or rearwardly, the gear cluster 292 and clutch drum 324 rotate in the direction indicated by the arrow in Fig. 18, or clockwise. During rotation in such direction, the frictional drag between the external cylindrical surface of drum 324 and the internal surface of the coils of the clutch spring 318 tends to unwind the clutch spring 318, as a result of which the diameter thereof is expanded, and the drum 324 overruns the clutch spring. When the transmission 284 is set for driving the vehicle forwardly or rearwardly and the vehicle tends to move, such as by coasting, in a direction opposite to that for which the transmission is set, the gear cluster 292 will tend to rotate in a counter-clockwise direction, and the drum 324 will tend to wrap up the clutch spring 318. Since one end of the clutch spring 318 is anchored at 326, the spring 318 will grip the drum 324 and lock the same against rotation in such (counter-clockwise) direction, as a result of which, movement of the vehicle will be prevented. The tendency of the clutch spring 318 to wind up when the drum 324 rotates in a counter-clockwise direction is due to the frictional drag between the spring 318 and the drum 324 and to the energizing action of the spring 344 acting on the end 328 of the spring through the medium of bar 332.

Similarly, backfiring of the engine will be prevented if the clutch 12 is engaged by the device illustrated in Fig. 17.

To release the clutch spring 318 and consequently keep the safety brake or sprag 283 from holding the vehicle, the bar or rod 332, in the notch 330 of which the free end 328 of clutch spring 318 is received, is operable by a pedal 334 such as the brake pedal of the vehicle or any pedal located in the driver's compartment, to which pedal the bar is connected by a linkage comprising pedal arm 336, spring 338, rod 340 and bell crank 342. Manipulation of pedal 334 operates or moves bar 332 against the compression of spring 344 to move the end 328 of a spring 318 to unwind the same, as a result of which the diameter of spring 318 is enlarged sufficiently to remove the frictional drag between the internal surface of the spring 318 and the external surface of drum 324 so that drum 324 is free to rotate in a counter-clockwise direction, to permit movement of the vehicle in a direction opposite to that for which the transmission is set.

Upon movement of bar 332 by pedal 334, a latch 346 is adapted to engage notch 348 for holding bar 332 in position to maintain spring 318 released until drum 324 is rotated in a clockwise direction. A ratchet wheel 350, formed integral with gear 300 is engageable upon clockwise rotation thereof with a pawl 352 carried upon the upper end of latch 346 for releasing latch 346 from engagement with the notch 348 in bar 332 to permit spring 344 to restore the bar 332 to normal position, whereupon the end 328 of clutch spring 318 will be released and the sprag mechanism will again be operative for holding drum 324 against counter-clockwise rotation. The pawl 352 is capable of a limited amount of rotation to permit the teeth of the ratchet wheel 350 to ratchet over the pawl 352, if the gear cluster 292 rotates in a counter-clockwise direction when the sprag is released. A spring 354 biases pawl 352 in a counter-clockwise direction to the limit of its movement in that direction, as shown. Notch 348 of rod 332 is provided with a beveled surface 349 for raising latch 346 sufficiently to move pawl 352 clear of ratchet wheel 350.

It will therefore be seen that if the car is stopped in gear on a hill and the sprag 283 operates to hold the vehicle against downhill movement, it will be necessary to release the sprag in order to take the load off the gear teeth in order to permit the transmission to be shifted. To release the sprag 283, the pedal 334 is operated, which moves the end 328 of spring 318 for expanding the diameter thereof, as a result of which the gear cluster 292 will be free to turn counter-clockwise and pawl 352 will move to a position (as a result of latch 346 dropping in notch 348) where the ratchet teeth can engage therewith for releasing latch 346 by rotation of the gear cluster 292 in a clockwise direction.

If the vehicle is moving downgrade with the clutch 12 disengaged and the transmission is set for moving the vehicle upgrade, the sprag will not reset as the pawl 352 will be clicking over the teeth of the ratchet wheel 350, which, at such time, is turning in a counter-clockwise direction. However, if it is desired to have the sprag 283 hold the car against downgrade movement to facilitate starting the car upgrade, it may be accomplished by holding the vehicle against movement with the foot brakes and engaging the clutch 12 momentarily, when the transmission is in neutral, so as to cause ratchet 350 to engage the pawl 352 for releasing latch 346, which permits the clutch spring 318 to wind up for preventing retrograde movement of the car when the transmission thereafter is set for driving the vehicle uphill when the clutch is disengaged and before the foot brakes are released.

Figs. 19, 20, and 21 illustrate a sprag arrangement which includes a one-way clutch and release on the main shaft of the transmission, which is released by the shift mechanism of the transmission upon shifting to reverse and which stays released until the car moves forwardly.

The main shaft 288 has keyed to it a cam 360 of a one-way roller clutch which also includes a shell 362 and rollers 364 operatively disposed in eccentric raceways provided between the oppositely disposed surfaces of the cam 360 and shell 362. Shell 362 is provided with a drum portion 366, which has an outside diameter slightly greater than the inside diameter of a clutch spring 368, one end 370 of which is anchored in a slot 372 to prevent rotation of the spring 368. The other end 374 of the clutch spring is movable to reduce its radial contact with drum 366 so that said drum can turn reversely when it is desired to move the vehicle rearwardly, said end 374 being movable by the end of a lever 376 carried by one end of a shaft 378, to the other end of which is affixed a lever 380 which is movable upon setting the transmission mechanism for reverse and through the agency of shift rod 130 and a slidably mounted pin 382. The spring-pressed poppet 384 is engageable in notches 386 and 387 for holding the pin 382 from shifting accidentally.

When the vehicle is being driven forwardly, the roller clutch will permit the drum 366 of the sprag device to remain stationary, with the result that no overrunning will take place between the drum 366 and the clutch spring 368, with a consequent elimination of wear of these parts. However, when the shaft 288 tends to rotate in a direction corresponding to reverse movement of the vehicle, the roller clutch will lock the drum 366 for rotation with the shaft 288, and the clutch spring 368 normally will grip the drum and lock the same against movement in such reverse direction. When the transmission has been shifted to reverse, the vehicle may be power driven rearwardly or permitted to coast rearwardly, even though the transmission might have been subsequently restored to neutral without having driven the car forwardly. The sprag mechanism is adapted to be reset or restored to operative condition by forward movement of the vehicle after the transmission has been restored to neutral. When the transmission has been set for reverse to render the sprag mechanism inoperative, the lever 376 is rotated in a counter-clockwise direction, looking at Fig. 21, and a head 388 of the lever 376 is movable out of a notch 390 formed in a vertically movable rod 392 and against the tension of a spring-pressed member 394, as a result of which the rod 392 moves downwardly to bring a pawl 396 thereon in position to be engaged by the teeth of a ratchet wheel 398 formed on the shaft 288. The pawl 396 is pivoted to the rod 392 and spring-pressed to the position in which it is shown in Fig. 20, but has a slight amount of movement in a clockwise direction from the position in which it is shown to permit the teeth of the ratchet wheel 398 to click over the same if the vehicle moves rearwardly when the pawl is in its lower position.

When the rod 392 drops to its lower position, the pawl is moved to a position where it will be engaged by the teeth of the ratchet wheel 398 upon forward movement of the vehicle to lift the rod 392 to the position in which it is shown. The rod 392 drops to its lowermost position, as a result of the head 388 of the lever 376 being moved out of the notch 390 to hold the lever 376 in a position to maintain the clutch spring 368 released. It will thus be seen that when the sprag mechanism has been rendered inoperative by shifting to reverse, it will remain inoperative until the vehicle moves forwardly, subsequent to restoring the transmission to neutral, when it will automatically be reset. After the transmission has been restored to neutral, subsequent to shifting to reverse, and the car is moved forwardly, the rod 392 is lifted by the teeth of the ratchet wheel 398, and the head 388 of the lever 376 backed by the spring-pressed plunger 394 rides down the inclined surface of the rod 392 into the groove 390 for holding the pawl 396 clear of the ratchet wheel 398.

In Fig. 22 there is illustrated in longitudinal cross section another modification of the invention which is adapted to be controlled by the control mechanism illustrated in any of the previous figures, such, for instance, as that illustrated in Figs. 12, 13, and 14. In this construction the driven shaft 288 projecting from the rear of the transmission casing 14 extends through a pair of clutch members 400 and 402, clutch member 402 being suitably fixed to the transmission casing and clutch member 400 being splined to the shaft 288 for rotation therewith. The clutch members 400 and 402 are provided with internal aligned cylindrical clutching surfaces. A clutch spring 404 comprising a main clutching portion 406 and an energizing portion 408 is disposed within the clutch members 400 and 402. One end of the main clutch portion 406 of the spring is fixed at 410 to the clutch member 402 to hold the clutch spring against rotation, and the other end of the main portion 406 of the clutch spring is provided with an aperture 412 in which there is secured one end 414 of the energizing portion 408. The main portion 406 of the clutch spring may have an external diameter slightly less than the internal diameter of the clutch members so as to be substantially out of frictional engagement therewith, and the energizing portion 408 may have an external diameter slightly greater than the internal diameter of the clutch member 400 so as to provide a slight frictional drag between the energizing portion 408 and the clutch member 400. When the vehicle is being driven forwardly, the clutch member 400 rotates in a direction which tends to wind up the spring and reduce the diameter thereof. When the shaft 288 tends to rotate in a direction corresponding to reverse movement of the vehicle, the frictional drag between the energizing portion of the clutch spring and the clutch member 400 tends to unwind the spring, as a result of which the clutch member 400 is gripped and held against rotation for preventing rearward movement of the vehicle. A sleeve 416 telescopically disposed about and free of the shaft 288 is provided at one end thereof with a lug 418 which is engageable with the free end 420 of the energizing portion 408 for winding up the same to reduce the external diameter thereof and to reduce the frictional drag between the spring 408 and the clutch member 400 so that when the clutch member 400 tends to rotate in the reverse direction, the spring 408 will not be affected by such reverse rotation and consequently the shaft 288 will be free to rotate reversely. The other end of the sleeve 416 is provided with a finger 422 which is adapted to be engaged by the lug 202 of the control mechanism.

If the control mechanism illustrated in Figs. 12, 13, and 14 is used in connection with the device illustrated in Fig. 22, such device will operate in exactly the same manner as the device illustrated in Fig. 13.

While several specific embodiments of my invention have been illustrated and described, it must be appreciated that many modifications may be made in the construction thereof without departing from the scope of the invention, and for that reason I do not desire to be limited to any particular form or arrangement except in so far as such limitations are included in the following claims.

I claim:

1. A motor vehicle having in combination a shaft rotatable in either direction, a plurality of driving means, each operable for rotating said shaft in either direction, a fixed member, a one-way clutch device having one element connected to said fixed member, another element adapted to rotate with said shaft in at least one direction, and a third element normally cooperable with said other elements for automatically preventing rotation of said shaft under the influence of one of said driving means in said one direction only, means operable incidental to controlling the rotation of said shaft by the other of said driving means for rendering said third element inoperative, and a latch mechanism cooperable with said means to maintain said third element inoperative after said last named driving means have been rendered inoperative, said latch mechanism being adapted to be released by rotation of said shaft in the other direction by either of said driving means.

2. A motor vehicle having in combination a member mounted for rotation, a plurality of driving means, each operable for rotating said member in either direction, an overrunning clutch device normally operable for automatically preventing the rotation of said member in one direction under the influence of only one of said driving means, a control member operable, incidental to setting the other of said driving means for rotating said member in the same direction, for rendering said overrunning clutch device inoperative to prevent the rotation of said member in said direction, and a pair of independent latch mechanisms operable to hold said control member for maintaining said overrunning clutch device inoperative to prevent the rotation of said member in said direction under the influence of said first mentioned driving means after the other of said driving means have been rendered inoperative to rotate said member.

3. A motor vehicle having in combination, a fixed member, a rotatable member, driving means operative for rotating said member in either direction, manually operable means controlling said driving means for selecting the direction of rotation of said rotatable member, a one-way torque transmitting frictionally operable member secured to said fixed member and normally cooperable with said rotatable member to prevent rotation thereof in one direction relative to said fixed member, mechanism operable for moving said torque transmitting member out of operative engagement with said rotatable member to permit said driving means to rotate said rotatable member in either direction relative to said fixed member, said mechanism being operable incidental to the operation of said manually operable means to select a drive for the direction in which said torque transmitting member is operative, latch means engageable with said mechanism for maintaining the same operable after said manually operable means have been moved to render said driving means inoperative, and means operated by rotation of said member in the direction opposite to that in which said torque transmitting member is operable for releasing said latch means from engagement with said mechanism.

4. In a safety brake device for vehicles having a transmission, the combination of a casing adapted to be secured to the transmission and about a power shaft projecting from the same, a drum adapted to rotate in at least one direction with said shaft and having a cylindrical surface, an anchor block secured to said casing, a clutch spring having one end secured by said anchor block, a plurality of spring turns telescopically disposed with respect to a cylindrical surface of said drum and out of frictional engagement therewith, and an energizing portion comprising at least one spring turn at the free end of the clutch spring and in frictional engagement with the said surface of said drum so that said drum normally is free to rotate only in one direction with respect to said clutch spring, a slidable plate carried by said casing and adapted to act on said energizing portion to move the same out of locking frictional engagement with said drum, to permit the rotation of said drum in both directions relative to said clutch spring, said plate being movable to act on said energizing portion incidental to the setting of said transmission for a reverse drive, means tending to move said plate out of engagement with said energizing portion of said spring, a latch opposing the movement of said plate and releasable incidental to setting said transmission for driving the vehicle forwardly, and a second latch opposing the movement of said plate and releasable by rotary movement of said drum in its normally free direction.

5. In a safety brake for a motor vehicle having a power shaft connected to the road wheels and a gear shift transmission controlling the application of power to said shaft, a casing secured to said transmission and about said shaft, a clutch drum adapted to rotate in at least one direction with said shaft and disposed within said casing, a clutch coil spring telescopically disposed with respect to said clutch drum having one end fixed to said casing and a portion at the free end in locking frictional engagement with the surface of said drum normally to permit the rotation of said drum in one direction only with respect to said clutch spring, a spring-biased plate movable into a position for acting on said portion of said clutch spring to move the same out of locking frictional engagement with the surface of said drum, to permit the rotation thereof in either direction with respect to said clutch spring, and a plurality of latches for holding said plate in said position, one of said latches being releasable incidental to setting said gear shift transmission for a drive to rotate said shaft in its normally free direction and the other of said latches being releasable by rotation of said shaft in its normally free direction, said latches when released permitting the movement of said plate out of engagement with said portion of said spring to allow the same to be moved into one-way locking frictional engagement with said drum.

6. In a device of the class described, a power shaft operatively connected to the road wheels of a vehicle, a shiftable gear transmission for controlling the application of power to said shaft and including at least a single slidable shift rod projecting from said transmission and movable in one direction incidental to setting the transmission to rotate said shaft in one direction and movable in the opposite direction incidental to setting said transmission to rotate said shaft in the opposite direction, a casing secured to said transmission and about said shaft, a cylindrical clutching surface afforded by said shaft, a clutch coil spring having one end adjustably secured to said casing and the main portion disposed about said clutching surface, the free end portion of said clutch spring being in frictional engagement with said clutching surface so as to permit normally the free rotation of said shaft in one direction only with respect to said spring, a releasing plate movable into engagement with the free end of said spring for expanding the same to move said portion out of frictional engagement with said clutching surface, said plate being movable into engagement with the end of said spring when the shifter rod is moved for setting the transmission in reverse gear, a latch carried by said casing and engageable with said plate for holding the same in engagement with the end of said spring, a toothed element rotatable with said shaft, and a pawl carried by said latch cooperable with said toothed element for releasing said latch from engagement with said plate upon rotation of said shaft in the direction in which it is normally free to rotate.

7. A safety brake for a motor vehicle having a power shaft connected to the road wheels of the vehicle and a gear shift transmission for selecting the direction in which the shaft is to be power driven and including at least one shift rod which is movable in one direction when the vehicle is set for a forward drive and which is movable in the opposite direction when the vehicle is set for a rearward drive, a casing secured to said transmission and about said power shaft, an overrunning clutch device having one element thereof affixed to the power shaft and a second element rotatable only in one direction with respect to said first mentioned element and affording a cylindrical clutching surface, a clutch spring telescopically disposed with respect to said clutch surface and being secured at one end to said casing and having a portion adjacent the free end thereof in one-way locking frictional engagement with said clutch surface normally to prevent rotation of said second element in one direction, a plate movable into engagement with the end of said spring for moving the same out of locking frictional engagement with said clutch surface, said plate being movable into engagement with said spring incidental to the operation of said transmission to select a reverse drive, a latch for holding said plate in engagement with said spring, a toothed element carried by said power shaft, and a pawl carried by said latch and engageable with said toothed element for releasing said plate from engagement with said latch upon rotation of said driven shaft in a forward direction.

8. A safety brake for vehicles having a gear shift transmission and a shaft operatively connected to the road wheels of the vehicle and to said transmission and having in combination a casing disposed about said shaft, a clutch sleeve provided with a cylindrical clutching surface, a one-way clutching element associated with said shaft and with said sleeve and operable for connecting the same for rotation together in one direction only, a clutch coil spring telescopically disposed with respect to said clutching surface having one end thereof fixed to said casing and a portion of at least one spring turn at the free end thereof in frictional engagement with said clutching surface, said spring normally being operable to hold said sleeve against rotation only in the direction in which the one-way clutching element is operable, means actuated incidental to setting said transmission for rotating said shaft in said direction and operable thereby for moving said spring out of operative frictional engagement with said clutching surface to free said sleeve for rotation in said direction with said shaft, a latch engageable with said means to hold said spring out of operative frictional engagement with said clutching surface, and latch releasing means actuated by rotation of said shaft in the opposite direction subsequent to setting said transmission for neutral and operable for releasing said means from engagement with said latch.

9. A safety brake for engine driven vehicles having a gear shift transmission and a power shaft operatively connected to the road wheels of the vehicle and to said transmission and comprising a casing through which said shaft extends, a pair of clutch sleeves having concentric cylindrical clutching surfaces disposed about said shaft, one of said sleeves being rotatable with said shaft in at least one direction, a clutch coil spring telescopically disposed with respect to said clutching surfaces having one end thereof fixed with respect to the other of said sleeves, and an energizing portion at the free end thereof in frictional engagement with the clutching surface of said rotatable sleeve, said spring normally being operable for locking said rotatable sleeve to said other sleeve to hold said rotatable sleeve against rotation in one direction with respect to said other sleeve, a slidable plate actuated incidental to setting said transmission for rotating said shaft in said direction and operable for moving the energizing portion of said spring out of operative frictional engagement with said clutching surface of said rotatable sleeve, a latch engageable with said plate for holding said energizing spring portion out of operative frictional engagement with said rotatable sleeve clutching surface, and a pawl actuated by rotation of said shaft in the opposite direction subsequent to shifting said transmission out of reverse and operable for releasing said plate from engagement with said latch.

10. In a vehicle having a gear shift transmission including a shifter rod movable in one direction upon setting said transmission for driving said vehicle in a forward direction and movable in the opposite direction upon setting said transmission for driving the vehicle in a rearward direction, a rotatable shaft operatively connected to said transmisson and to the road wheels of said vehicle and provided with a cylindrical clutching surface, a casing secured to said transmission and about said shaft, a coil clutch spring telescopically disposed with respect to said cylindrical clutching surface and having an energizing portion at one end thereof in frictional engagement with said clutching surface, means for adjustably securing the other end of said spring to said casing, said clutch spring normally being cooperable with said surface for securing said shaft against rotation in the direction resulting from a rearward movement of said vehicle, a slidable plate abutting the free end of said spring and having a portion for cooperation with the end of said shifter rod whereby said plate may be moved thereby incidental to setting said transmission for rotating said shaft to drive said vehicle rearwardly, for moving said energizing spring portion out of operative frictional engagement with said clutching surface to free said shaft for rotation to move said vehicle rearwardly, a latch engageable with said plate so as to maintain said clutch spring out of frictional engagement with said clutching surface, and a pawl actuated by rotation of said shaft in a direction resulting from forward movement of said vehicle subsequent to shifting said transmission out of reverse to move said shifter rod out of operative engagement with said plate portion for releasing said latch from engagement with said plate.

11. In a vehicle having a gear shift transmission and a power shaft operatively connected to said transmission and to the road wheels of the vehicle, an overrunning clutch device having an element fixed to said shaft for rotation therewith and a second element rotatable with said first element in one direction only and affording a cylindrical clutching surface, a clutch coil spring having a cylindrical clutching portion cooperable with said clutching surface normally for securing said second element against rotation in the direction in which it is rotatable with said first element, means operable incidental to setting said transmission for rotating said shaft in said direction for rendering said spring ineffective, and other means operable for holding said clutch spring ineffective until the transmission has been restored to a neutral position and said shaft is rotated in the opposite direction.

12. In a safety brake for vehicles having a gear shift transmission and a power shaft operatively connected to said transmission and to the road wheels of said vehicle, the combination of a casing disposed about said shaft, a cylindrical clutch surface afforded on said shaft, a clutch spring secured at one end to said casing and comprising a plurality of spring turns disposed about said surface, and an energizing portion having a slight frictional engagement with said surface for holding said shaft against rotation in one direction only, means operable incidental to setting said transmission for rotating said shaft in said direction for moving said energizing portion of said clutch spring out of operative engagement with said clutching surface, means for holding said energizing portion out of operative engagement with said clutching surface until the transmission has been restored to neutral and said shaft has been rotated in the opposite direction, and manually operable means for locking said energizing portion on said clutch spring out of operative engagement with said clutching surface without regard to the direction in which said shaft is rotated after said transmission has been restored to neutral position.

13. A motor vehicle having in combination a shaft rotatable in either direction, a plurality of driving means, each operable for rotating said shaft in either direction, a fixed member, a one-way clutch device having one element connected to said fixed member, another element adapted to rotate with said shaft in at least one direction, and a third element normally cooperable with said other elements for automatically preventing rotation of said shaft under the influence of one of said driving means in said one direction only, means operable incidental to controlling the rotation of said shaft by the other of said driving means for rendering said third element inoperative, a latch mechanism cooperable with said means to maintain said third element inoperative after said last named driving means have been rendered inoperative, said latch mechanism being adapted to be released by rotation of said shaft in the other direction by either of said driving means, and a manual control cooperable with said means for locking said third element in an inoperative condition independently of said latch mechanism.

14. In a motor vehicle having a power shaft operatively associated with the road wheels and a transmission for selecting the direction in which the shaft is to be power driven, an overrunning clutch device having one element thereof affixed to the power shaft, a second element rotatable in one direction only with respect to said first mentioned element and affording a cylindrical clutching surface, a clutch spring telescopically disposed with respect to said surface and being fixed at one end, said clutch spring having a portion adjacent the free end thereof in one-way locking frictional engagement with said surface normally to prevent rotation of said second element in one direction, a mechanism cooperable with said spring for preventing locking engagement between the same and said surface, said mechanism being operable incidental to the operation of said transmission to select a reverse drive, means cooperable with said mechanism for maintaining said spring out of locking frictional engagement with said surface after said transmission has been restored to neutral, and means for releasing said mechanism from said last named means upon rotation of said shaft in a forward direction.

15. In a motor vehicle, a shaft adapted to be power driven in both directions and operatively associated with the road wheels of the vehicle, a transmission operable for selecting the direction in which said shaft is to motor driven, a self-wrapping frictionally operated clutch device associated with said shaft and normally operable for preventing rotation of said shaft in a reverse direction except when said transmission is set for motor driving said shaft reversely, and means operative for maintaining said device inoperative after said transmission is shifted out of reverse until said transmission is shifted to a forward gear and said shaft is forwardly rotated thereafter.

16. In a motor vehicle, a shaft adapted to be motor driven in both directions and operatively associated with the road wheels of the vehicle, a transmission operable for selecting the direction in which said shaft is to be motor driven, an automatic mechanism operatively associated with said shaft and normally operable for preventing reverse rotation of said shaft except when said transmission is set for motor driving said shaft in a reverse direction, said mechanism including a drum adapted to rotate in at least one direction with said shaft and having a clutching surface, a clutch spring including a plurality of spring turns anchored at one end thereof and telescopically disposed with respect to said clutching surface, the free end of said clutch spring being in slight frictional engagement with said surface and being normally adapted to lock said drum against rotation in one direction, and an annular ring having a surface concentric with the surface of said drum and disposed in telescopic relationship with at least the first spring turn at the anchored end of said spring.

17. In a motor vehicle, a shaft operatively associated with the road wheels of the vehicle and adapted to be motor driven in both directions, a transmission operable for selecting the direction in which said shaft is motor driven and including a shifter rod movable in one direction upon setting said transmission for driving said vehicle in a forward direction and movable in the opposite direction upon setting said transmission for driving the vehicle in a rearward direction, a friction mechanism operatively associated with said shaft and normally operable for preventing reverse rotation thereof except when said transmission is set for reverse, latch means operable upon setting said transmission for reverse for maintaining said mechanism inoperative, and means operable incidental to motor driving said vehicle in a forward direction for rendering said latch means inoperable.

18. In a motor vehicle, a shaft adapted to be motor driven in both directions and operatively associated with the road wheels of a vehicle, a transmission operable for selecting the direction in which said shaft is to be motor driven, an automatic mechanism operatively associated with said shaft and normally operable for preventing reverse rotation thereof except when said transmission is set for reverse, said mechanism including a member adapted to rotate in at least one direction with said shaft, a relatively fixed member, said members being provided with aligned clutching surfaces, a clutch spring anchored at one end thereof and telescopically disposed with respect to said clutch surfaces, said spring being adapted to prevent relative rotation in one direction between said members, and a bearing operatively disposed between said members and adapted to align the clutching surfaces of the same.

19. In a motor vehicle transmission, a shaft, frictionally operable mechanism for automatically preventing movement of said shaft in one direction, said mechanism including a drum and a clutch spring comprising a plurality of spring turns disposed about said drum and frictionally engageable with the surface thereof for locking the same against rotation in one direction, means for rendering and maintaining said mechanism inoperative, and means operable for rendering said mechanism operative by rotation of a part of said transmission in the other direction.

20. In a motor vehicle transmission including forward and reverse gears, a shaft, mechanism for automatically preventing movement of said shaft in one direction, a device operable for rendering said mechanism inoperable, means for maintaining said device operable, comprising a plurality of latch mechanisms, one of said latch mechanisms being releasable by rotation of a part of said transmission in the other direction and the other of said latch mechanisms being releasable by setting said transmission in a forward gear.

21. In a device of the class described, a shaft operatively connected with the road wheels of a vehicle, an automatic mechanism operatively associated with said shaft and operable for preventing undesired reverse movement of said vehicle, said mechanism including a drum adapted to rotate in at least one direction with said shaft and having a clutching surface, a clutch spring including a plurality of spring turns, anchored at one end thereof and telescopically disposed with respect to said clutching surface, the free end of said clutch spring being frictionally engageable with said clutching surface and being adapted to lock said drum against rotation in one direction.

22. In a device of the class described, a shaft operatively connected with the road wheels of a vehicle, an automatic mechanism operatively associated with said shaft and operable for preventing undesired reverse movement of said vehicle, said mechanism including a drum adapted to rotate in at least one direction with said shaft and having a clutching surface, a clutch spring, including a plurality of spring turns, anchored at one end thereof and telescopically disposed with respect to said clutching surface, the free end of the clutch spring being engageable with the clutching surface and being adapted to lock said drum against rotation in one direction, and an annular ring having a surface concentric with the surface of said drum and disposed in telescopic relationship with at least the first spring turn at the anchored end of said spring.

23. In a safety brake for vehicles having a transmission, the combination of a power shaft projecting from said transmission and operatively connected to the road wheels of the vehicle, a drum adapted to rotate in at least one direction with said shaft and having a cylindrical clutching surface, a clutch spring disposed about said drum and frictionally engageable with the surface thereof to prevent relative rotation in one direction therebetween, a movable member cooperable with the free end of said spring and operable for holding the same out of gripping engagement with said drum to permit the rotation of said drum in both directions relative to said spring, said member being movable to act on the free end of said spring incidental to the setting of said transmission for a reverse drive, a latch for maintaining said member operable and releasable incidental to setting said transmission for driving the vehicle forwardly, and a second latch for maintaining said member operable and releasable by rotary movement of a part of said transmission in a forward direction.

24. In a motor vehicle transmission, a shaft arranged to be stationary or to be rotated in forward or reverse directions, mechanism automatically operative when said shaft is stationary to prevent undesired reverse rotation thereof, a device for rendering said mechanism inoperative by a shift to reverse when it is desired to drive said shaft in the reverse direction, and means for thereafter rendering said device inoperative by arranging the transmission to drive said shaft in a forward direction and by driving the shaft in a forward direction.

25. In a motor vehicle transmission including a member operatively associated with the road wheels of the vehicle and arranged to be stationary or to be rotated in forward and reverse directions, mechanism normally and automatically operative to prevent undesired rotation of said member and including a spring clutch, a device for rendering said mechanism inoperative when it is desired to rotate said member in reverse, and means for maintaining said mechanism inoperative even though the transmission is restored to neutral when the vehicle is moving backwardly.

26. In a motor vehicle transmission including a member arranged to be stationary or to be rotated in forward and reverse directions and operatively associated with the road wheels of the vehicle, mechanism normally and automatically operative to prevent undesired reverse rotation thereof and including a spring clutch, a device for rendering said mechanism inoperative when the same is under load to permit backward movement of said vehicle, and means for maintaining said mechanism inoperative even though the transmission is restored to neutral.

27. In a motor vehicle transmission having a member adapted to be driven by a source of power, a mechanism connected to said member to normally and automatically arrest movement of said member in one direction, said mechanism including a spring clutch, a device operable for rendering said mechanism inoperative under load to permit movement of said member in said direction, and means for rendering said device inoperable thereby to reset said mechanism by rotation of said member in the other direction.

28. In a motor vehicle transmission, a shaft arranged to be stationary or to be rotated in either direction and operatively associated with the road wheels of the vehicle, a self-wrapping mechanism associated with said shaft and operative for preventing rotation of said shaft in one direction, a device operable for readily rendering said mechanism inoperative when the same is under load to permit movement of said vehicle in said direction, means for rendering said device inoperative upon arranging said transmission for rotating said shaft in the other direction and upon rotation of a part of said transmission in said other direction.

29. In a motor vehicle transmission, a shaft operatively associated with the road wheels of the vehicle, shift means whereby said transmission may be set for driving said vehicle in a selected direction, a mechanism comprising a spring clutch operatively associated with said shaft and normally operable for automatically holding said shaft to prevent movement of said vehicle in the opposite direction, a device operable for rendering said mechanism inoperable to permit the shaft to be rotated in a reverse direction, and a power driven element for rendering said device inoperative upon movement of said vehicle in the opposite direction.

30. In a motor vehicle transmission, including a member operatively associated with the road wheels of the vehicle and arranged to be stationary or to be rotated in forward or reverse directions, friction mechanism normally and automatically operative to prevent undesired rotation of said member, means for rendering said mechanism inoperative when it is desired to rotate said member in reverse, and a latch operable for maintaining said mechanism inoperable even though said member is arranged to be rotated in a forward direction.

31. In a motor vehicle transmission, including a member operatively associated with the road wheels of the vehicle and arranged to be stationary or to be rotated in forward or reverse directions, friction mechanism normally and automatically operative to prevent undesired rotation of said member, means for rendering said mechanism inoperative when it is desired to rotate said member in reverse, a latch operable for maintaining said mechanism inoperable, and means for rendering said latch inoperable incidental to arranging the transmission for rotating said member in a forward direction and rotating said member in a forward direction.

32. In a motor vehicle transmission, including a member operatively associated with the road wheels of the vehicle and arranged to be stationary or to be rotated in forward or reverse directions, friction mechanism normally and automatically operative to prevent undesired rotation of said member, means for rendering said mechanism inoperative when it is desired to rotate said member in reverse, a latch operable for maintaining said mechanism inoperable, and means for releasing said latch incidental to moving said vehicle in a forward direction.

33. In a motor vehicle transmission, including forward and reverse gears, a shaft, mechanism for automatically preventing movement of said shaft in one direction, a device operable for rendering said mechanism inoperative incidental to arranging said transmission for driving said shaft reversely, means for maintaining said mechanism inoperable comprising a plurality of latch mechanisms, one of said latch mechanisms being releasable by rotation of a part of said transmission in a forward direction, and the other of said latch mechanisms being releasable incidental to shifting of one of said forward gears.

34. In a motor vehicle transmission including a member operatively associated with the road wheels of the vehicle and arranged to be stationary or to be rotated in forward and reverse directions, mechanism normally and automatically operative to prevent undesired rotation of said member and including a spring clutch, a device for rendering said mechanism inoperative when it is desired to rotate said member in reverse, and means for maintaining said mechanism inoperative, even though the transmission is arranged for forwardly rotating said member.

35. In a motor vehicle transmission, a shaft operatively associated with the road wheels of the vehicle, shift means adapted for arranging said transmission for driving said vehicle forwardly and reversely, mechanism including a spring clutch operatively associated with said shaft and automatically operable for preventing movement of said vehicle in one direction when the transmission is arranged for driving said vehicle in the other direction, and means cooperable with said spring clutch for rendering said mechanism inoperative when the same is under load to permit movement of said vehicle in said one direction.

36. In a motor vehicle transmission, a shaft operatively associated with the road wheels of the vehicle, shift means adapted for arranging said transmission for driving said vehicle forwardly and reversely, mechanism including a spring clutch operatively associated with said shaft and automatically operable for preventing movement of said vehicle in one direction when the transmission is arranged for driving said vehicle in the other direction, said mechanism being adapted to be rendered inoperative to prevent movement of said vehicle in said one direction when said transmission is arranged for driving said vehicle in said one direction, and means for maintaining said mechanism inoperable even though the transmission is not arranged for driving said vehicle in either direction.

37. A transmission mechanism for a motor vehicle including forward and reverse gearing, a safety clutch comprising a spring clutch mechanism connected therewith for normally preventing movement of the vehicle for a direction contrary to the direction in which the transmission gearing is engaged for moving the vehicle, and means operative at will for disengaging said clutch mechanism to permit the free shifting of said gearing, said means comprising a latch mechanism.

38. A transmission for motor vehicles comprising a transmission mechanism including forward and reverse gears, a safety clutch device comprising a spring clutch mechanism connected with one of said gears and arranged to permit the free movement of said gears in a given direction, and to normally prevent the free movement thereof in an opposite direction, and means for rendering said clutch mechanism inoperative, said means comprising a latch mechanism for maintaining said mechanism inoperative.

39. A transmission for motor vehicles comprising a transmission mechanism including forward and reverse gears, a safety clutch device comprising a spring clutch mechanism connected with one of said gears and arranged to permit the free movement of said gears in a given direction, and to normally prevent the free movement thereof in an opposite direction, and means for rendering said clutch mechanism inoperative, said means comprising a latch mechanism for maintaining said mechanism inoperative, and a further latch mechanism adapted to render said first mentioned latch mechanism inoperative upon movement of said gears in said given direction.

40. A transmission for a motor vehicle comprising, in combination, a member rotating in the same direction whichever direction the vehicle is driven, and means comprising a spring clutch mechanism operatively connected to said member at all times and rendered immediately effective by a reverse rotative tendency of said member to prevent reverse rotation thereof, together with a driver-controlled device for rendering said means inoperative, said device comprising a latch mechanism for maintaining said means inoperative, and a further latch mechanism adaptable to render said first mentioned latch mechanism inoperative upon forward rotation of said member.

41. A transmission for a motor vehicle comprising, in combination, a member rotating in the same direction whichever direction the vehicle is driven, and means operatively connected to said member at all times and rendered immediately effective by a reverse rotative tendency of said member to prevent reverse rotation thereof, a driver-controlled device for rendering said means inoperative and a latch operable for maintaining said means inoperative and adapted to be released by rotation of said member.

42. In a vehicle transmission for operatively connecting a driving and a driven member, a driving and driven gears, a stationary countershaft, a cluster gear on said countershaft, driven by said driving member and selectively cooperating with said driven gears to provide a determined gear ratio, automatic restraining means for said cluster gear, said automatic means comprising a spring clutch mechanism, and means controllable at the will of the operator to release said restraining means.

43. In a motor vehicle transmission, a shaft operatively associated with the road wheels of the vehicle, shift means adapted for arranging said transmission for driving said vehicle forwardly and reversely, mechanism including a spring clutch comprising a main spring clutch portion and an energizing spring clutch portion operatively associated with said shaft and automatically operable for preventing movement of said vehicle in one direction when the transmission is arranged for driving said vehicle in the other direction, and means cooperable with said spring clutch for rendering said mechanism inoperative when the same is under load to permit movement of said vehicle in said one direction.

44. In an automotive vehicle, means for selectively driving said vehicle forwardly and rearwardly, a spragging device comprising a drum, one-way clutch means associating said drum with a shaft of said driving means, a self-energizing element associated with said drum for arresting rotation thereof when said drum is driven through said clutch, means, actuated upon operation of said driving means to drive said vehicle rearwardly, for rendering said self-energizing element ineffective, and means actuable only by forward movement of said vehicle for returning said self-energizing element to effective condition.

CARL F. RAUEN.